United States Patent
Jensen et al.

(10) Patent No.: US 8,352,282 B2
(45) Date of Patent: Jan. 8, 2013

(54) SYSTEM AND METHOD FOR MANAGING AND DEPLOYING FUNCTIONAL SERVICES TO A VEHICLE CLIENT

(75) Inventors: Peter Strarup Jensen, Fremont, CA (US); Pavel S. Veselov, Santa Clara, CA (US); Venkata S. Ayyagari, Foster City, CA (US); Nikolay G. Grigoryev, St. Petersburg (RU)

(73) Assignee: Oracle International Corporation, Redwood City, CA (US)

( * ) Notice: Subject to any disclaimer, the term of this patent is extended or adjusted under 35 U.S.C. 154(b) by 180 days.

(21) Appl. No.: 12/819,015

(22) Filed: Jun. 18, 2010

(65) Prior Publication Data

US 2010/0280932 A1 Nov. 4, 2010

Related U.S. Application Data

(63) Continuation of application No. 10/104,298, filed on Mar. 22, 2002, now abandoned.

(51) Int. Cl.
*G06Q 10/00* (2012.01)
(52) U.S. Cl. ........................................................ 705/1.1
(58) Field of Classification Search .................. None
See application file for complete search history.

(56) References Cited

U.S. PATENT DOCUMENTS 6,856,820 B1 * 2/2005 Kolls ........................ 455/575.9

* cited by examiner

*Primary Examiner* — Jonathan Ouellette
(74) *Attorney, Agent, or Firm* — Martine Penilla Group, LLP (57) ABSTRACT

An invention is provided for a system for managing and deploying software functionality to a vehicle client including a server including a user preference list, a communication tier, applications for receiving a request from the vehicle client, the request identifying the particular user preference and applications for deploying the selected plurality of services and the plurality of service directories in the particular user's preference list to the vehicle client in response to a request from the vehicle client. The user preference list includes a selected plurality of services subscribed by a corresponding particular user's preference list, each one of the plurality of services including a plurality of software components and information for use of a corresponding service, wherein the selected plurality of services are downloadable service implementation components and a plurality of service directories, each service directory including a list of service objects. The communication tier couples the server and a plurality of devices via one or more networks, wherein the plurality of devices includes at least one vehicle client.

15 Claims, 5 Drawing Sheets

SYSTEM AND METHOD FOR MANAGING AND DEPLOYING FUNCTIONAL SERVICES TO A VEHICLE CLIENT

CROSS REFERENCE TO RELATED APPLICATIONS

This application is a continuation of and claims priority from U.S. patent application Ser. No. 10/104,298, filed on Mar. 22, 2002 now abandoned and entitled "Business-Model Agnostic Service Deployment Management Service," which is incorporated herein by reference in its entirety. This application is related to (1) U.S. patent application Ser. No. 10/104,267, now issued as U.S. Pat. No. 7,389,319, filed Mar. 22, 2002, and entitled "Adaptive Connection Routing Over Multiple Communication Channels," (2) U.S. patent application Ser. No. 10/105,121, now issued as U.S. Pat. No. 7,277,454, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," (4) U.S. patent application Ser. No. 10/104,297, now issued as U.S. Pat. No. 6,925,466, filed Mar. 22, 2002, and entitled "Asynchronous Protocol Framework," (5) U.S. patent application Ser. No. 10/104,295, now issued as U.S. Pat. No. 7,313,547, filed Mar. 22, 2002, and entitled "Manager Level Device/Service Arbitrator," (6) U.S. patent application Ser. No. 10/104,246, filed Mar. 22, 2002, and entitled "Java Telematics System Preferences," (7) U.S. patent application Ser. No. 10/104,243, now issued as U.S. Pat. No. 7,146,307, filed Mar. 22, 2002, and entitled "System and Method for Testing Telematics Software," (8) U.S. patent application Ser. No. 10/104,860, now issued as U.S. Pat. No. 7,171,345, filed Mar. 22, 2002, and entitled "System and Method for Simulating an Input to a Telematics System," (9) U.S. patent application Ser. No. 10/104,294, now issued as U.S. Pat. No. 7,127,386, filed Mar. 22, 2002, and entitled "Java Telematics Emulator," and (10) U.S. patent application Ser. No. 10/104,245, now issued as U.S. Pat. No. 7,058,898, filed Mar. 22, 2002, and entitled "Abstract User Interface Manager with Prioritization," which are incorporated herein be reference.

BACKGROUND OF THE INVENTION

1. Field of the Invention

This invention relates generally to telematic computer devices, and more particularly abstract communication using an asynchronous protocol framework for telematic systems.

2. Description of the Related Art

Telematics refers to systems used for communications, instrumentation, control, and information technology in the field of transportation. Over the years, manufacturers of on-road vehicles, such as automobiles, vans, trucks, buses, and so on, have utilized computer technology to enhance the operations of existing features and functions in the vehicles as well as to provide new features and functions. For example, programmed controllers, custom-designed processors, embedded systems, and/or computer modules have been developed that support or even control various kinds of mechanical equipment in vehicles. For example, programmed controllers or computer modules have been developed that control or support various engine functions, such as fuel injection, timing, and so on. Programmed controllers or computer modules have been developed to enhance or support operation of transmission systems, suspension systems, braking systems, and so on. The sophistication of these enhancements has advanced as the processing power available for these purposes has increased. It is expected that in the future more aspects of the mechanical equipment in vehicles will be controlled or supported by processors or controllers in order to enhance performance, reliability, and safety, to reduce emissions, and so on.

Aside from using computer technology to support various mechanical functions in vehicles, processors, controllers, or other programmed computer-based technologies are used in vehicles in other ways. Car phones, entertainment equipment (such as CD players), in-vehicle navigation systems, and emergency roadside assistance systems are examples. In addition, new kinds of equipment that provide entirely new features may become available in vehicles. For example, vehicles may include radar systems that detect obstacles on the road ahead and then automatically brake the vehicle to prevent accidents. Another example is an in-vehicle email system that automatically downloads and reads the driver's email. These new kinds of equipment are likely to include one or more processors and appropriate programming.

These new kinds of equipment hold the promise of making the operation of a vehicle safer, more reliable, less polluting, and more enjoyable. However, there are several considerations related to providing these kinds of features that constrain implementation. One consideration relates to maintaining information concerning the services or content available to the remote vehicle devices. Information concerning client devices and various relationships between client devices and data services that can be used to implement provisioning should be stored.

In view of the foregoing, there is a need for a mechanism for maintaining information relevant to managing the deployment of software services to vehicle client devices. The mechanism should further include information concerning software services, client devices, and relations between these entities.

SUMMARY OF THE INVENTION

Broadly speaking, the present invention fills these needs by providing a system for managing and deploying software functionality to a vehicle client including a server including a user preference list, a communication tier, applications for receiving a request from the vehicle client, the request identifying the particular user preference and applications for deploying the selected plurality of services and the plurality of service directories in the particular user's preference list to the vehicle client in response to a request from the vehicle client. The user preference list includes a selected plurality of services subscribed by a corresponding particular user's preference list, each one of the plurality of services including a plurality of software components and information for use of a corresponding service, wherein the selected plurality of services are downloadable service implementation components and a plurality of service directories, each service directory including a list of service objects. The communication tier couples the server and a plurality of devices via one or more networks, wherein the plurality of devices includes at least one vehicle client.

Each of the plurality of service directories can include a set of related services, the set of related services capable of being deployed on the vehicle client. At least one of the plurality of deployed services can be a user entry object. The request from the vehicle client can include a change to the particular user preferences.

The system can also include an application for managing a subscription of a service. The application for managing the subscription of a service can include an application for billing the particular user for the subscribed service. The server can also include a list of the plurality of selected services downloaded to the vehicle client.

Another embodiment provides a method for managing and deploying software functionality to a vehicle client. The method includes storing a user preference list in a server. The user preference list includes a selected plurality of services subscribed by a corresponding particular user's preference list, each one of the plurality of services including a plurality of software components and information for use of a corresponding service, wherein the selected plurality of services are downloadable service implementation components and a plurality of service directories, each service directory including a list of service objects. The method further includes coupling the server and a plurality of devices via one or more networks, wherein the plurality of devices includes at least one vehicle client. A request is received from the vehicle client, the request identifying the particular user preference and the selected plurality of services and the plurality of service directories the particular user's preference list are deployed to the vehicle client in response to a request from the vehicle client.

Another embodiment provides a system for managing and deploying software functionality to a vehicle client. The system includes server and the server includes a user preference list, a communication tier, applications for receiving a request from the vehicle client, the request identifying the particular user preference and applications for deploying the selected plurality of services and the plurality of service directories in the particular user's preference list to the vehicle client in response to a request from the vehicle client. The user preference list includes a selected plurality of services subscribed by a corresponding particular user's preference list, each one of the plurality of services including a plurality of software components and information for use of a corresponding service, wherein the selected plurality of services are downloadable service implementation components and a plurality of service directories, each service directory including a list of service objects. The communication tier couples the server and a plurality of devices via one or more networks, wherein the plurality of devices includes at least one vehicle client. The server also includes a list of the plurality of selected services downloaded to the vehicle client and an application for managing a subscription of a service including an application for billing the particular user for the subscribed service.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a business-model agnostic service deployment management service. Embodiments of the present invention maintain information relevant to managing the deployment of software services to vehicle client devices. This information includes data concerning software services, client devices, and relations between these entities. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
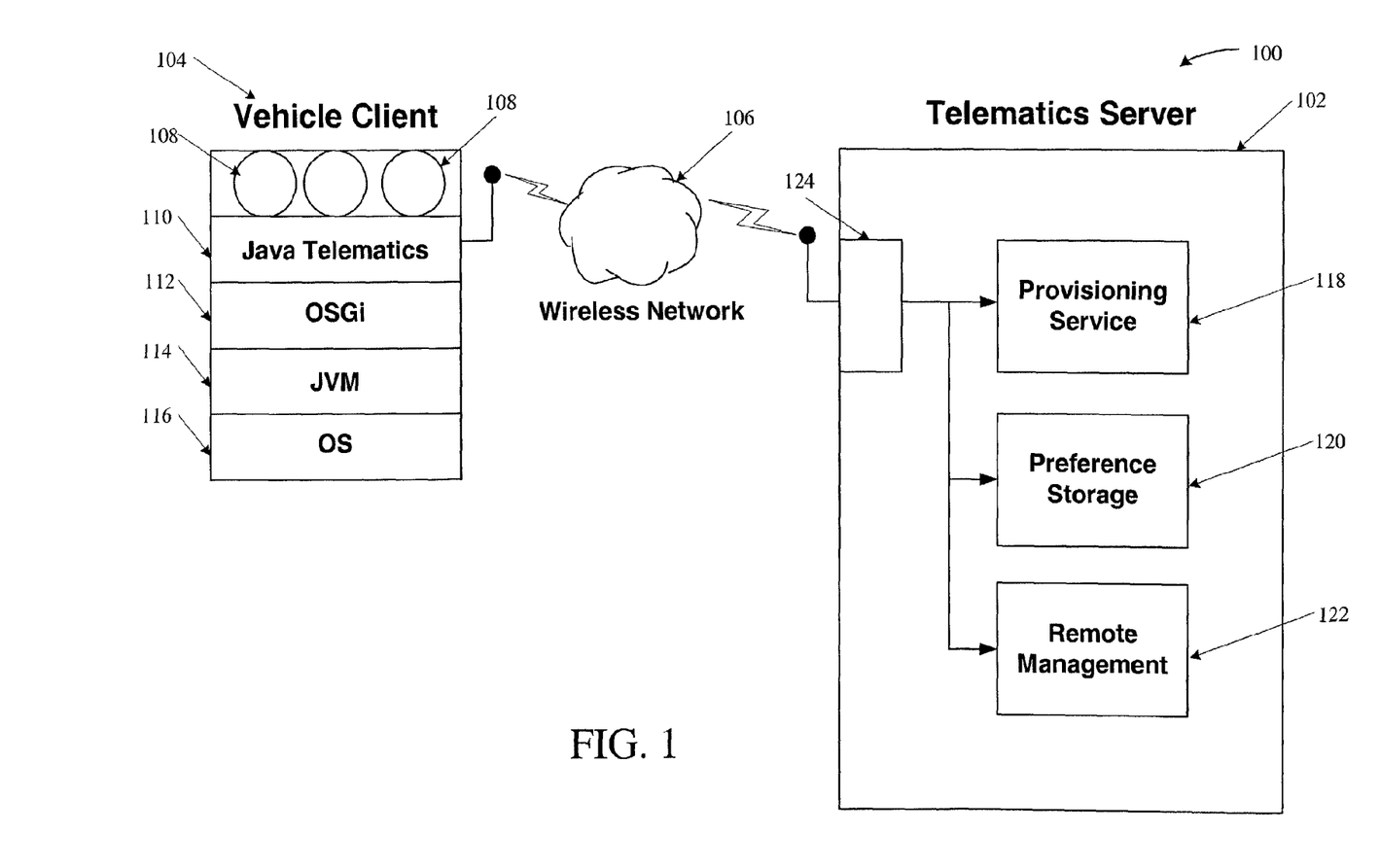
FIG. 1 is a diagram showing an exemplary wireless telematics system, in accordance with an embodiment of the present invention.

FIG. 1 is a diagram showing an exemplary wireless telematics system 100, in accordance with an embodiment of the present invention. As shown in FIG. 1, the wireless telematics system 100 includes a telematics server 102 in communication with a vehicle client 104 via a wireless network 106. The vehicle client 104 is generally implemented on a vehicle such as a car truck or van to provide enhanced functionality, such as navigation, entertainment, and communication. In one embodiment, the vehicle client 104 includes a plurality of carlets 108, which are individual software programs that provide specific functionality to the vehicle client 104. In addition, the vehicle client 104 generally includes a plurality of software layers, such as a Java telematics layer 110, an open services gateway initiative layer 112 (OSGi), a Java virtual machine layer 114, and an operating system 116.

The vehicle client 104 can be executed on a vehicle computing platform, which may include an interactive screen, global positioning satellite (GPS) system hardware, audio speakers, and microphone. In addition, the vehicle computing platform may include voice recognition software and speech generation capability. Further, the vehicle computing platform may be in communication with a vehicle bus, which allows communication with vehicle sensors to provide vehicle diagnostic information. As mentioned above, the vehicle client 104 can communicate wirelessly with the telematics server 102.

The telematics server 102 receives wireless communications using a communications application programming interface (API) framework 124. The communications API framework 124 provides a standardized framework for processing wireless communications independent of the actual physical networking hardware used for the wireless communications. In addition the communications API framework 124 allows communications with multiple networks, both wireless and non-wireless, such as the Internet.

Broadly speaking, the telematics server 102 includes provisioning service 118, preference storage 120, and remote management 122. The provisioning service 118 manages and provides the provisioning and downloading of carlets 108 to individual vehicle clients 104. In this manner the provisioning service 118 allows dynamic updating of the software functionality (i.e., carlets 108). For example, a user can subscribe to a particular service using a web page that is in communication with the telematics server 102. In response, the telematics server 102 can utilize the provisioning service 118 to deploy to the user's vehicle client 104, the carlets 108 associated with the particular service subscribed to by the user. When deploying carlets 108 to vehicle clients 104, embodiments of the present invention store user preferences using the preference storage 120.

Broadly speaking, the preference storage 120 is a storage of user preferences that can be made available to the computing platform executing the vehicle client 104. In addition, the vehicle client 104 can cache a portion of, or the entire contents of, the user's preference data stored in the preference storage 120. As above, a user may access the telematics server 102 via a web application to update their user preferences. Thereafter, the vehicle client 104 may request the updated user preferences from the preference storage 120. In this manner, a user can update their user preferences without having to utilize a limited vehicle computing platform interface.

The remote management 122 allows the telematics server 102 to manage the software and preferences on individual vehicle clients 104. For example, the remote management 122 can contact a vehicle client 104 and query information as to which carlets 108 are installed on the vehicle client 104. Further the remote management 122 can control the installing and uninstalling of applications and request vehicle status. In this manner, the telematics server 102 can remotely manage the vehicle clients 104.

Figure 2A:
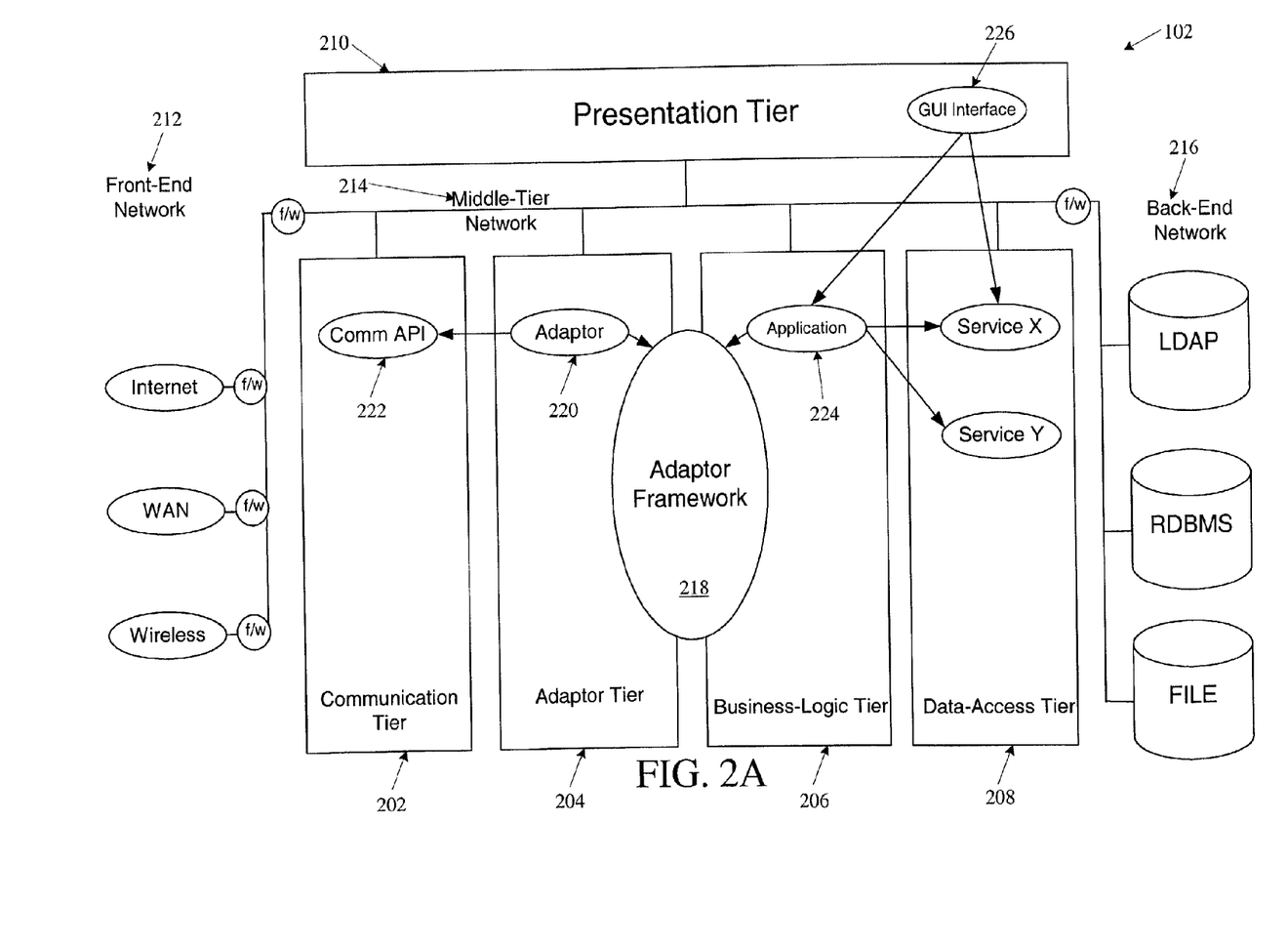
FIG. 2A is a functional diagram showing an exemplary telematic server, in accordance with an embodiment of the present invention.

FIG. 2A is a functional diagram showing an exemplary telematic server 200, in accordance with an embodiment of the present invention. The telematic server 200 generally is organized into five logical tiers, namely, the communication tier 202, the adaptor tier 204, the business-logic tier 206, the data-access tier 208, and the presentation tier 210.

FIG. 2A depicts the five logical tiers of the telematic server 102 and illustrates how the logical tiers relate to a typical network architecture, in this case comprised of three logical network-tiers: front-end network 212 (or DMZ), middle-tier network 214 (or application network), back-end network 216 (or information-systems network). It should be noted that FIG. 2A shows a logical network architecture. In a development environment, there can be only one physical network, while a deployment environment can include multiple physical networks separated by firewalls. For example, although the communication tier 202 is shown connected to both the front-end 212 and the middle-tier network 214, a physical machine is not required to be connected to both networks. The connection illustrates that the implementation of components in the communication tier 202 may be distributed across machines connected to either network.

The components depicted in FIG. 2A show the general model of how end- to-end applications or services are implemented in the telematics server 102. The client-side of the typical service is implemented by a service-bundle, which can be deployed to and executed on a vehicle client device. A service-bundle is an archive containing executable code (e.g. carlets), resources (e.g. images and error messages in appropriate languages), configuration and descriptive information. The vehicle client device communicates with the telematic server 102 through a deployment specific network, abstracted by communication APIs 222 in the communication tier 202. On the server-side, an adaptor 220 handles the application-level communication management (e.g. open, accept and close connections, send and receive data, etc.). Through the adaptor framework 218 the adaptor 220 is bound to an application component 224 implementing the server-side business-logic. The adaptor framework 218 allows adaptors 220 and applications 224 to be developed and deployed independently. Application components 224 are typically implemented using one or more generic services provided by the data-access tier 208.

In addition to any user interfaces provided by the client device, an end-to-end service may be accessible through other user interfaces 226, implemented in the presentation tier 210. This may include both applications for use by the service provider's employees or agents (e.g. client device administration, call centers, etc.), and customers (e.g. subscription management and other web services).

The communication tier 202 includes components implementing network protocols and interfaces. By using the APIs offered by communication tier 202, components in other tiers can communicate with remote vehicle client devices, as well as other types of clients, such as web-browsers. The communication tier 202 is connected to the front-end network 212 through which external networks (e.g. internet, wireless client network, etc.) are accessible. In addition, the communication tier 202 is connected to the middle-tier network 214, thus making the various communication APIs available to the other logical tiers.

In one embodiment, the communication tier 202 provides Intranet and Internet APIs, and telematic server communication APIs. The Intranet and Internet APIs can be provided by a general J2EE platform. Depending on the deployment, these APIs may or may not be available for communication with client devices. The telematic server communication APIs can be used to communicate with client devices supporting a compatible (interoperable) implementation of the corresponding client-side communication APIs, such as vehicle clients.

In order to abstract away from the specific communication mechanisms and application-level protocols employed by different types of client devices, the telematic server 102 defines a protocol API. The protocol API abstracts the generic application-level protocol that the telematic server 102 supports. In one embodiment, the protocol API includes a collection of request and reply handler interfaces. Handlers for incoming communications (requests and replies) are implemented by applications 224, while handlers for outgoing communications (requests and replies) are implemented by adaptors 220. For example, an application 224 may provide an interface that allows the application 224 to handle a client's request for a list of available services, while an adaptor 220 may provide an interface for sending such a list to a client.

Adaptors 220 provide client-specific application-level protocol management and communication. An adaptor 220 uses the communication APIs 222 offered by the communication tier 202 to communicate with individual vehicle client devices. In a simple case there is a one-to-one correspondence between the application-level protocol supported by the vehicle client and by the generic protocol reflected by the telematic server protocol API. That is, any communication received by an adaptor 220 will result in the invocation of a method on the interface of an appropriated application 224, and any invocation of a method on an adaptor API will result in a message being sent to a client device.

However, if the application-level protocol supported by the client doesn't match the telematic server protocol API, then the adaptor 220 is also responsible for mapping the client specific protocol to the telematic server protocol API. For example, a single request from a vehicle client device may require multiple requests to one or more applications 224.

The business-logic tier 206 includes components called applications 224. Applications 224 include the deployment specific business logic required to implement particular services. For example, a service discovery application may be responsible for calculating a reply when a client requests a list of available services. How to format the reply and how to send it is defined by a client specific protocol definition, and implemented by an adaptor 220. However, determining the content of the service list depends on the deployment's business rules. For example, the list could be pre-defined by the customer's service agreement, or the list might be calculated dynamically based on the vehicle client device's capabilities, or on other factors such as location.

In addition to the interface for handling incoming communications, an application 224 may provide a second interface, providing access to business functions. For example, a continuously running remote client management application may provide an interface for scheduling management activities, use an adaptor 220 to send directives to vehicle client devices at the scheduled time, and implement a reply handler interface allowing the adaptor 220 to deliver asynchronous replies.

The adaptor framework 218 supports, registration of adaptors 220 and applications 224, lookup of adaptors 220 and applications 224, binding between adaptors 220 and applications 224, and allowing adaptors 220 to pass strongly typed messages to appropriated applications 224 by invoking methods defined in the application interface, and vice versa.

The adaptor framework 218 allows an adaptor 220 to specify the appropriated application 224 (or vice versa), based on type, implementation and session. For example, a vehicle client specific service-discovery adaptor 220 may receive a request for a list of available services. After parsing and validating the request, the adaptor 220 tries to lookup a reference to a vehicle client (implementation) service-discovery (type) application to handle the request.

If any vehicle client service-discovery applications are registered with the adaptor framework 218, then the reference is bound to one of them (if there is more than one, the choice is implementation specific). If there are none, the adaptor framework 218 will attempt to bind to a default, client type neutral, service-discovery application. Assuming a suitable application is found, the adaptor 220 forwards the request to the application, passing along a reply address. If the client/server protocol uses asynchronous messaging, then the return address supplied by the adaptor may simply specify that the reply should go to any vehicle client service-discovery adaptor. But, if instead, the client/server protocol is based on synchronous communication, the adaptor creates a session and includes the session identifier in the return address, thus allowing the application to reply to the same adaptor. When the application is ready it uses the reply address in the request to lookup a reference to an adaptor and sends the reply.

The data-access tier 208 includes generic services for storing, managing and accessing deployment data. In general, a given service may be used by multiple applications 224, just as an application 224 may make use of multiple services. On one side the data-access tier 208 is connected to the middle-tier network 214, making services available to applications 224 in the business-logic tier 206, and to the presentation tier 210. On the other side, the data-access tier 208 connects to the back-end network 216 through which data storage systems (e.g. RDBMS, LDAP, file-servers, etc) are accessed, using existing J2EE APIs (e.g. JDBC, JNDI).

The presentation tier 210 includes various end-user interfaces available to the service provider's employees, agents or customers, through Internet or Intranet connectivity as appropriated. In addition to graphical user interfaces 226, the presentation tier 210 may include command-line utilities (scripts and programs) more appropriated for batch mode of operation (e.g. convert a existing customer database). Besides using various Internet and Intranet communication APIs, the components in the presentation tier 210 generally use the APIs of components in the data-access 208 and business-logic 206 tiers.

Figure 2B:
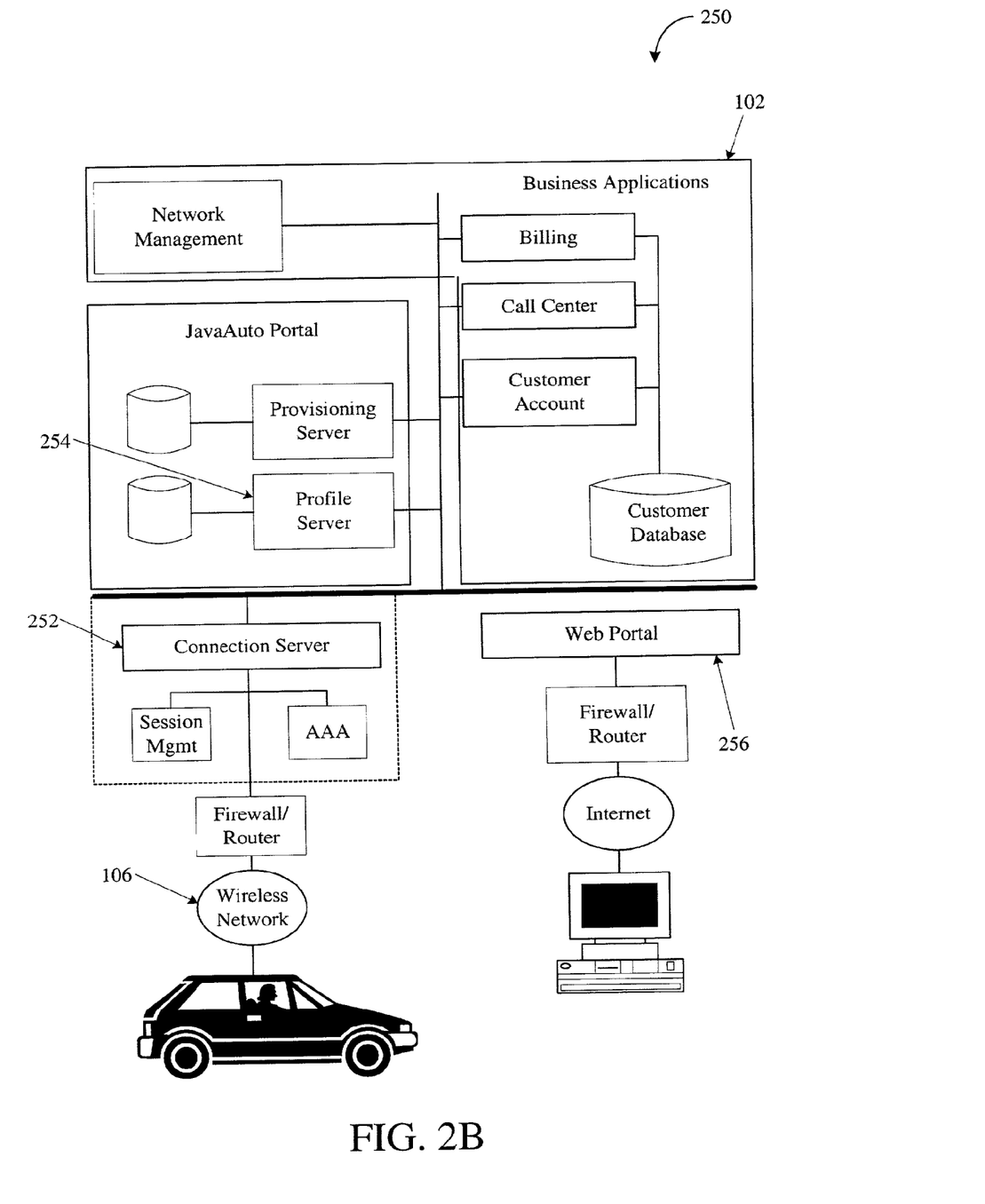
FIG. 2B is a block diagram an exemplary telematics server architecture, in accordance with an embodiment of the present invention.

FIG. 2B is a block diagram an exemplary telematic server architecture 250, in accordance with an embodiment of the present invention. The telematic server architecture 250 illustrates the interaction of components including the connection server 252 and the profile server 254, often accessed via a web portal 256.

The connection server 252 establishes, accepts, maintains, and terminates connections over the wireless network. In addition, the connection server 252 interacts with a security server to maintain secure end-to-end sessions. Further, the connection server 252 is responsible for both incoming and outgoing connections. The API for the telematic server 102 includes functions for making connections to vehicles. This includes support for both synchronous and asynchronous communication. Communication can be subject to prioritization, allowing the implementation to arbitrate limited network resources. Further, the telematic API masks the developer from the details of the actual network and carrier infrastructure.

Generic security can also be provided by the telematic server architecture 250. For example, security features can include authentication, authorization, encryption, and session management. For example, the communication system can be required to mutually authenticate the server and client devices, and only accept communication from authorized sources.

In addition, the communication system of the telematic server architecture 250 ensures data integrity and privacy. In addition, the system may provide application-level security features to allow a common notion of "users" inside the server (e.g., a customer logging into a web-portal) and on client devices (e.g., the driver of a vehicle identified by their ignition key, or otherwise).

The telematics server 102 manages a database in which all deployed (or deployable) services are stored. This database may also store information about client devices. The service repository supports dynamic characterization and categorization of services for different purposes (e.g., the service available to a particular device, the category of games, the set of services a given customer has subscribed to, etc.).

The telematics server 102 provides service APIs for controlling deployment of services to vehicles. More specifically the telematics server 102 supports service discovery, service subscription, and service delivery. Using service discovery, vehicle clients can query the telematics server 102 for lists of services based on service categories and matching criteria, to determine the set of services available to a given device. Using service subscription, telematics server 102 can support management of individual service categories (e.g., the set of services a given customer has subscribed to). Using service delivery, telematics server 102 allows vehicle client devices to download services (subject to authorization). This can involve downloading service implementation components or other resources from 3rd party service providers to a local cache. In addition, the telematics server 102 performs service version management, and provides APIs to remotely manage deployed services (e.g., start, stop, uninstall, upgrade, change configuration, etc.).

The profile server 254 manages a database containing users' preferences data. Thus, the profile server 254 allows clients to read and write user and service-specific preferences (subject to authorization). In addition, the profile server 254 provides an API allowing server-side access to preferences as well. For example, a user can log into a web-portal 256 and modify their personal radio station preferences, using a convenient web interface, and later find the updated preferences installed in their vehicle.

As mentioned above, embodiments of the present invention provide services to vehicle clients. To maintain information concerning the services and content the telematic server can deliver to remote vehicle clients, embodiments of the present invention utilize a business-model agnostic service deployment management service.

Figure 3:
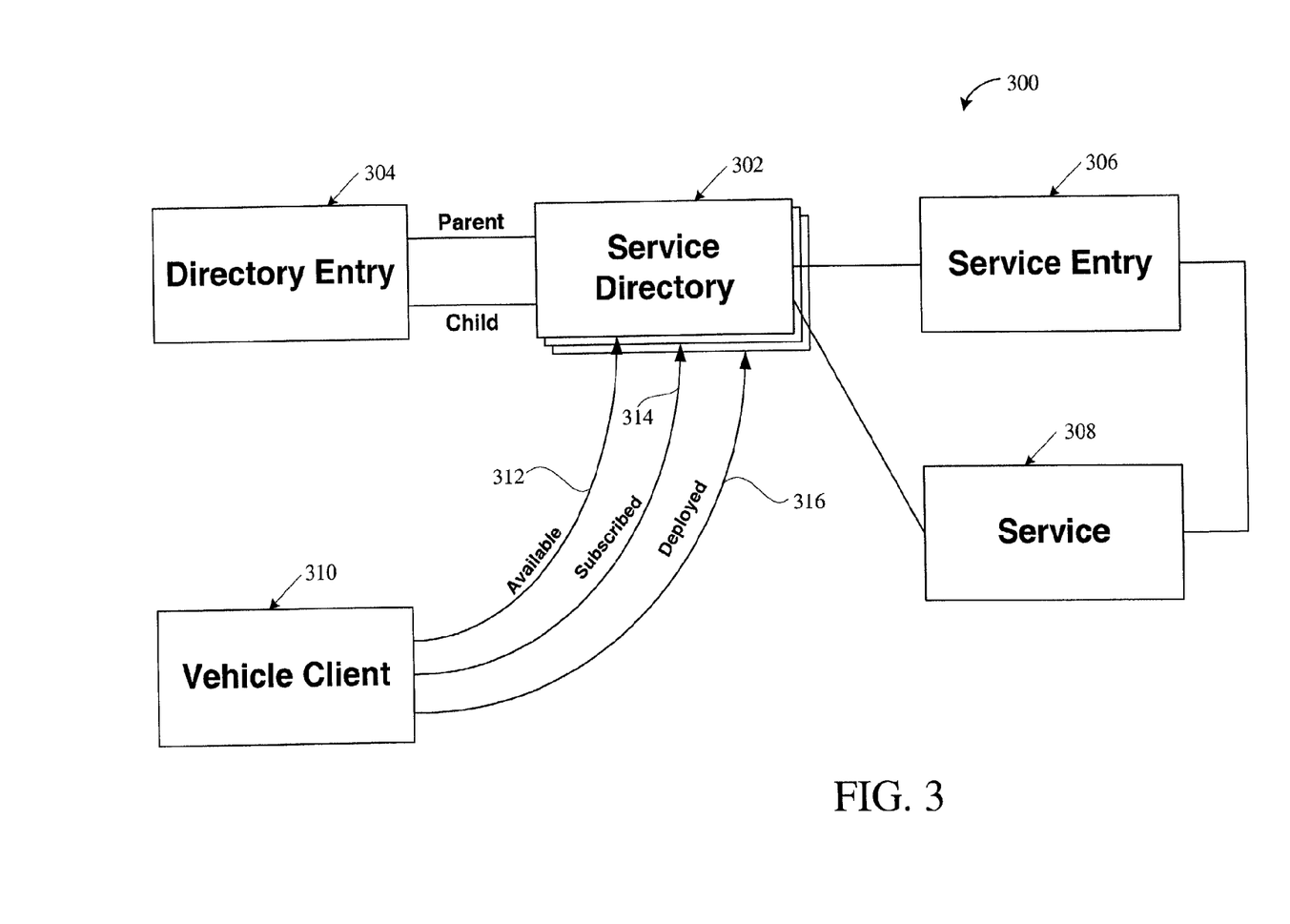
FIG. 3 is a block diagram showing an exemplary business-model agnostic service deployment management service, in accordance with an embodiment of the present invention.

FIG. 3 is a block diagram showing an exemplary business-model agnostic service deployment management service 300, in accordance with an embodiment of the present invention. The business-model agnostic service deployment management service 300 includes a service directory object 302 in communication with a plurality of directory entry objects 304, service entry objects 306, and service objects 308. In addition, the service directory object 302 is in communication with a plurality of vehicle client objects 310. Broadly speaking, the business-model agnostic service deployment management service 300 stores information concerning the client devices and the various relationships between the client devices and services.

The vehicle client object 310 represents a physical vehicle client device. In addition, the vehicle client object 310 can represent a logical vehicle client device to allow, for example, a user to keep their same vehicle client object 310 even though the user has a new car with a new vehicle client device. In such a case, a vehicle client object 310 can be applied to the new vehicle client device without reentering the user's preference data into the system. The vehicle client object 310 includes information concerning the vehicle device type and capabilities, the vehicle device owner, and/or the responsible customer (e.g., for billing purposes), and other information as desired by the developer.

The service object 308 represents information about a service as perceived by the user of the service. For example, a service object 308 can store a list of software components and other content required to use a service, the price of the service, any required client capabilities, and the types of supported clients. As implied above, the service object 308 does not need to correspond to a particular software artifact. That is, each service may utilize multiple software artifacts to provide the service to the user. In such cases, the service object 308 corresponds to the entire service, including all the software artifacts required to use the service.

The service directory object 302 represents sets of services and other service-directories, defined for different business-model specific purposes. For example, a service directory object 302 can include a list of services available to "gold" customers, a list of services to deploy to a given vehicle client device, and/or a list of services currently deployed on a particular vehicle client device. It should be noted that there is a many-to-many relationship between the service directory objects 302 and the service objects 308. That is, a service object 308 can be referenced by multiple service directory objects 302, and multiple service directory objects 302 can include the same service object 308.

To represent the relationship between a service directory object 302 and a service object 308, embodiments of the present invention utilize service entry objects 306. Service entry objects 306 indicate that a particular service object 308 is part of a particular directory. For example, a service entry object 306 can store information concerning membership conditions and expirations times. By having the service entry objects 306, embodiments of the present invention can store information about the relationship itself.

For example, a service entry object 306 can indicate that when a particular service object 308 is part of a first service directory 302, the particular service object 308 has a price of, for example, $5.00. In addition, another service entry object 306 can indicate that when the particular service object 308 is part of a second service directory 302, the particular service object 308 has a price of, for example, $10.00. Thus, the service entry objects 306 allow the embodiments of the present invention to quantify the relationship between the service objects 308 and the service directories 302.

The directory entry object 304 represents a relationship between a vehicle client object 310 and a service directory object 302. For example, a particular service directory 302 can be associated with a vehicle client object 310 as the set of services available to the vehicle client object 310, as shown by relation arrow 312. Similarly, a service directory 302 can be associated with a vehicle client object 310 as the set of services subscribed to by the user, as shown by relation arrow 314, or as the set of services deployed onto the vehicle device represented by the vehicle client object 310, as shown by relation arrow 316. Further, to organize the services into hierarchies, the directory entry objects 304 can be used to indicate that a particular service directory is the parent of another service directory 302.

Figure 4:
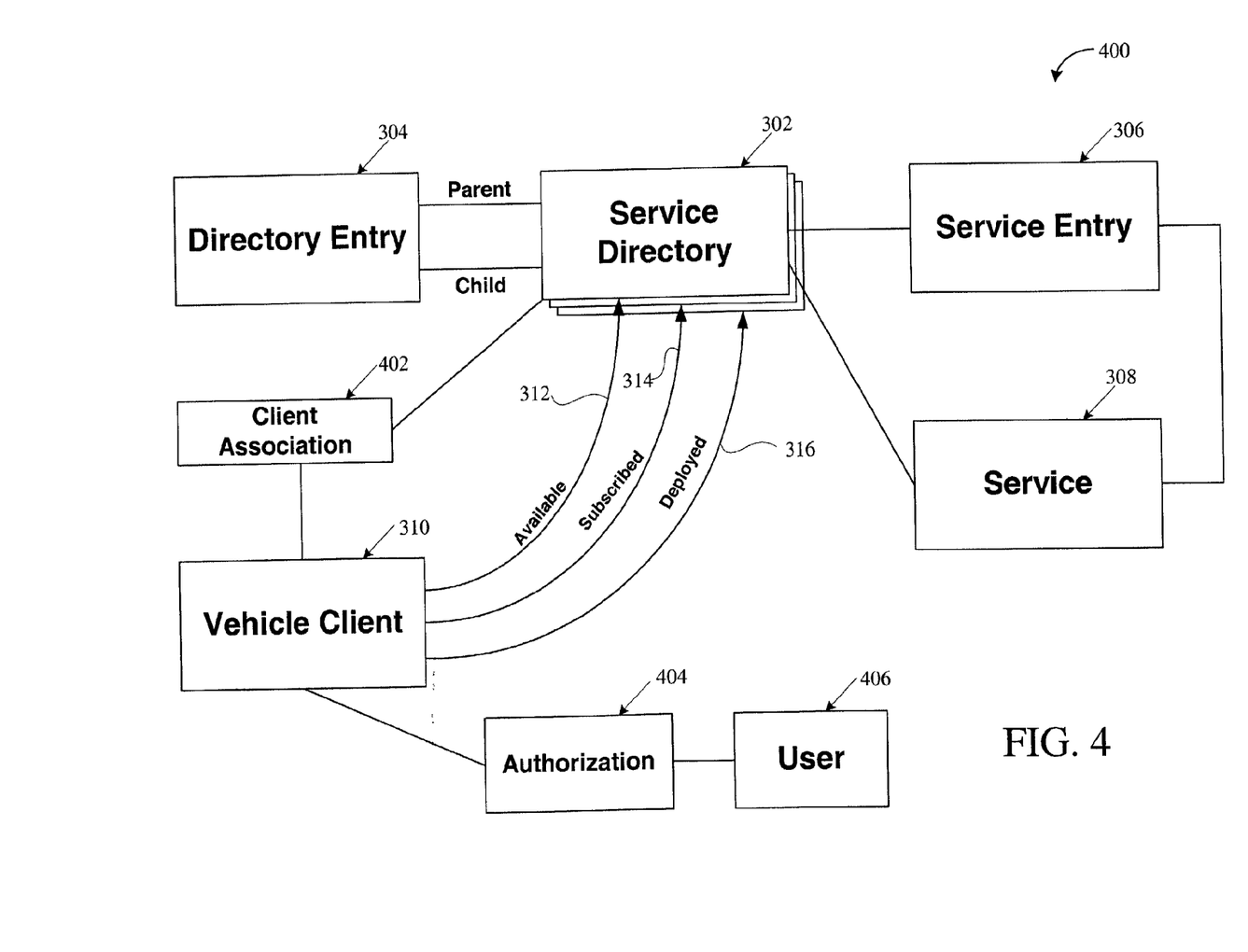
FIG. 4 is a block diagram showing an exemplary business-model agnostic service deployment management service having generic client association and user authorization, in accordance with an embodiment of the present invention.

FIG. 4 is a block diagram showing an exemplary business-model agnostic service deployment management service 400 having generic client association and user authorization, in accordance with an embodiment of the present invention. As above, the business-model agnostic service deployment management service 400 includes a service directory object 302 in communication with a plurality of directory entry objects 304, service entry objects 306, service objects 308, and a plurality of vehicle client objects 310. In addition, the business-model agnostic service deployment management service 400 includes a client association object 402, an authorization object 404, and a user object 406.

Client association objects 402 can generically indicate the relationships between the vehicle client objects 310 and the service directory objects 302. In this manner, the client association objects 402 can be used to quantify the relationships between each service directory 302 and the vehicle client objects 310. Thus, using the client association objects 402, the service entry objects 306, and the directory entry objects 304, the system 400 can be queried based on object relationship. For example, the system 400 can be queried for all services in a particular service directory associated with a particular client. In addition, the system 400 can be queried using search filters, which perform pattern matching on the data content of an object. For example, the system 400 can be queried for all services that require a speech engine to operate. Furthermore, the above-mentioned query types can be combined. For example, the system 400 can be queried for all services in a "gold-package," which is a specific service directory 302, that require a speech engine.

The user object 406 represents a particular user of a particular vehicle client 310. The user object 406 is related to a particular vehicle client object 310 via an authorization object 404. The authorization object 404 defines the kinds of authorization a particular user has related to the vehicle client device represented by the vehicle client object 310. Thus, the authorization object 404 defines the role the user 406 can play when using the vehicle client 310. For example, when a vehicle client devices requests preference data for a particular service, the authorization object 404 can be checked to determine if the user is authorized to use the client device and whether the user is authorized to receive the preference data.

In one embodiment, the telematics system of the embodiments of the present invention can be implemented using the Java programming language. In general, developers design Java applications as hardware independent software modules, which are executed Java virtual machines. The Java virtual machine layer is developed to operate in conjunction with the native operating system of the particular hardware on which the vehicle clients and telematic server are to run. In this manner, Java applications can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for managing and deploying software functionality to a vehicle client, comprising:
 a server including:
  a user preference list including:
   a selected plurality of services subscribed by a corresponding particular user's preference list, each one of the plurality of services including a plurality of software components and information for use of a corresponding service, wherein the selected plurality of services are downloadable service implementation components; and
   a plurality of service directories, each service directory including a list of service objects;
  a communication tier coupling the server and a plurality of devices via one or more networks, wherein the plurality of devices includes at least one vehicle client;
  applications for receiving a request from the vehicle client, the request identifying the particular user preference; and applications for deploying the selected plurality of services and the plurality of service directories in the particular user's preference list to the vehicle client in response to a request from the vehicle client, including applications for managing services previously installed on the vehicle client including uninstalling a non-preference listed service previously installed on the vehicle client and updating a preference listed service previously installed on the vehicle client.

2. The system of claim 1, wherein each of the plurality of service directories includes a set of related services, the set of related services capable of being deployed on the vehicle client.

3. The system of claim 1, wherein at least one of the plurality of deployed services is a user entry object.

4. The system of claim 3, wherein the request from the vehicle client includes a change to the particular user preferences.

5. The system of claim 1, further comprising an application for managing a subscription of a service.

6. The system of claim 5, wherein the application for managing the subscription of a service includes an application for billing the particular user for the subscribed service.

7. The system of claim 1, wherein the server further includes a list of the plurality of selected services downloaded to the vehicle client.

8. A method for managing and deploying software functionality to a vehicle client, comprising:
  storing a user preference list in a server, the user preference list including:
    a selected plurality of services subscribed by a corresponding particular user's preference list, each one of the plurality of services including a plurality of software components and information for use of a corresponding service, wherein the selected plurality of services are downloadable service implementation components; and
    a plurality of service directories, each service directory including a list of service objects;
  coupling the server and a plurality of devices via one or more networks, wherein the plurality of devices includes at least one vehicle client;
  receiving a request from the vehicle client, the request identifying the particular user preference; and
  deploying the selected plurality of services and the plurality of service directories in the particular user's preference list to the vehicle client in response to a request from the vehicle client, uninstalling a non-preference listed service previously installed on the vehicle client and updating a preference listed service previously installed on the vehicle client.

9. The method claim 8, wherein each of the plurality of service directories includes a set of related services, the set of related services capable of being deployed on the vehicle client.

10. The method of claim 8, wherein at least one of the plurality of deployed services is a user entry object.

11. The method of claim 10, wherein the request from the vehicle client includes a change to the particular user preferences.

12. The method of claim 8, further comprising managing a subscription of a service.

13. The method of claim 12, wherein managing the subscription of a service includes billing the particular user for the subscribed service.

14. The method of claim 8, wherein the server includes a list of the plurality of selected services downloaded to the vehicle client.

15. A system for managing and deploying software functionality to a vehicle client, comprising:
  a server including:
    a user preference list including:
      a selected plurality of services subscribed by a corresponding particular user's preference list, each one of the plurality of services including a plurality of software components and information for use of a corresponding service, wherein the selected plurality of services are downloadable service implementation components;
    a plurality of service directories, each service directory including a list of service objects; and
    a list of the plurality of selected services downloaded to the vehicle client;
  a communication tier coupling the server and a plurality of devices via one or more networks, wherein the plurality of devices includes at least one vehicle client;
  applications for receiving a request from the vehicle client, the request identifying the particular user preference;
  applications for deploying the selected plurality of services and the plurality of service directories in the particular user's preference list to the vehicle client in response to a request from the vehicle client, including applications for managing services previously installed on the vehicle client including uninstalling a non-preference listed service previously installed on the vehicle client and updating a preference listed service previously installed on the vehicle client; and
  an application for managing a subscription of a service including an application for billing the particular user for the subscribed service.

* * * * *

UNITED STATES PATENT AND TRADEMARK OFFICE
CERTIFICATE OF CORRECTION

PATENT NO. : 8,352,282 B2
APPLICATION NO. : 12/819015
DATED : January 8, 2013
INVENTOR(S) : Jensen et al.

Page 1 of 1

It is certified that error appears in the above-identified patent and that said Letters Patent is hereby corrected as shown below:

In the Specification:

In column 1, line 41, delete "be" and insert -- by --, therefor.

In the Claims:

In column 14, line 1, in Claim 9, after "method" insert -- of --.

Signed and Sealed this
Twenty-ninth Day of October, 2013

Teresa Stanek Rea
*Deputy Director of the United States Patent and Trademark Office*